Feb. 19, 1963 E. F. STEINERT 3,078,362
METHOD OF AND APPARATUS FOR ARC-WELDING
Filed Nov. 19, 1959

WITNESSES
Robert G Baird
James F. Young

INVENTOR
Emil F. Steinert.
BY
ATTORNEY

United States Patent Office 3,078,362
Patented Feb. 19, 1963

3,078,362
METHOD OF AND APPARATUS FOR ARC-WELDING
Emil F. Steinert, Williamsville, N.Y., assignor to Westinghouse Electric Corporation, East Pittsburgh, Pa., a corporation of Pennsylvania
Filed Nov. 19, 1959, Ser. No. 854,128
14 Claims. (Cl. 219—135)

This invention relates to the art of arc welding and has particular relationship to arc welding in which the power for welding is derived from a direct-current supply.

The scope of this invention in its broader aspects also includes arc melting or other arc heating to the extent that this invention may be applied for such purposes. While the claims of this application refer to arc welding, it is to be understood that the expression "arc welding" is intended to include within its scope arc melting or other arc heating to the extent that they are applicable.

It has been advantageous in welding with a direct-current supply to interpose an inductive reactor in series with the supply and the electrode and the work. Such a reactor is used in single-phase rectifier welders to prevent the welding current from being reduced to zero when the alternating-current potential drops to zero. (See Patent 2,825,004, Rebuffoni et al.) Such a reactor is also used with a supply of the constant-potential type, particularly in welding in a shield of carbon dioxide with the welding current density so low that the transfer is of the droplet instead of the spray type. (See application Serial No. 757,513, filed August 27, 1958, to Floyd E. Adamson and Martin Rebuffoni.) The reactance in this case stabilizes the deposit and suppresses spattering so that a sound weld is produced and the work is not marred and burned by the spatter.

The reactor in each case has a core with a fixed air-gap and includes facilities for coarsely varying the reactance in the form of series-parallel or tapped windings.

It is an object of this invention to improve the operation of direct-current arc welding apparatus of the above-described type in which an inductive reactor is interposed between the direct-current supply and the electrode and work.

Another object of this invention is to provide such apparatus which shall be capable of operating with high stability.

A further object of this invention is to provide a new method of welding with a constant-potential direct-current supply particularly in a shield of carbon dioxide in the practice of which the weld shall be formed by continuously and smoothly flowing droplets.

This invention arises from the realization that the desired highly stable welding may be achieved by precisely setting the reactance of the reactor so that the reactor interacts in precisely the proper manner with the highly irregular electrical fluctuations produced by the welding arc. In accordance with one aspect of this invention, the reactor includes a main winding which is connected in series with the supply and the electrode and work and an auxiliary winding which is connected in a closed circuit with a variable resistor. The resistor may be precisely set so that the rise and decay of the current through the main winding is at the proper rate to produce the smooth deposit of the fused metal. In many cases, it is desirable that the rise of current on the occurrence of a short circuit of the arc by a droplet be relatively low and gradual while the rise of potential; that is, the voltage peak when the arc is interrupted by an open circuit between the electrode and work be high and of proper duration. A high peak of proper duration instantaneously refires the arc. To achieve this object, a rectifier is connected in series with the variable resistance. The rectifier is so poled as to conduct the current induced in the auxiliary winding when the welding current through the main winding is increasing and to block the induced current when the welding current is decreasing. So that the potential peak will have the proper duration to refire the arc, the rectifier may be shunted by a high resistor.

In accordance with a further aspect of this invention, the main or the auxiliary winding of the reactor is connected in a resonant circuit with a capacitor and either of the circuits is tuned to correspond to the rate of droplet deposit so that the electrical fluctuations produced in the welding circuit by the droplets are substantially synchronized with the droplets.

The novel features considered characteristic of this invention are disclosed generally above. The invention itself both as to its organization and as to its method of operation together with additional objects and advantages thereof will be understood from the following description of specific embodiments taken in connection with the accompanying drawings, in which.

Figure 1:
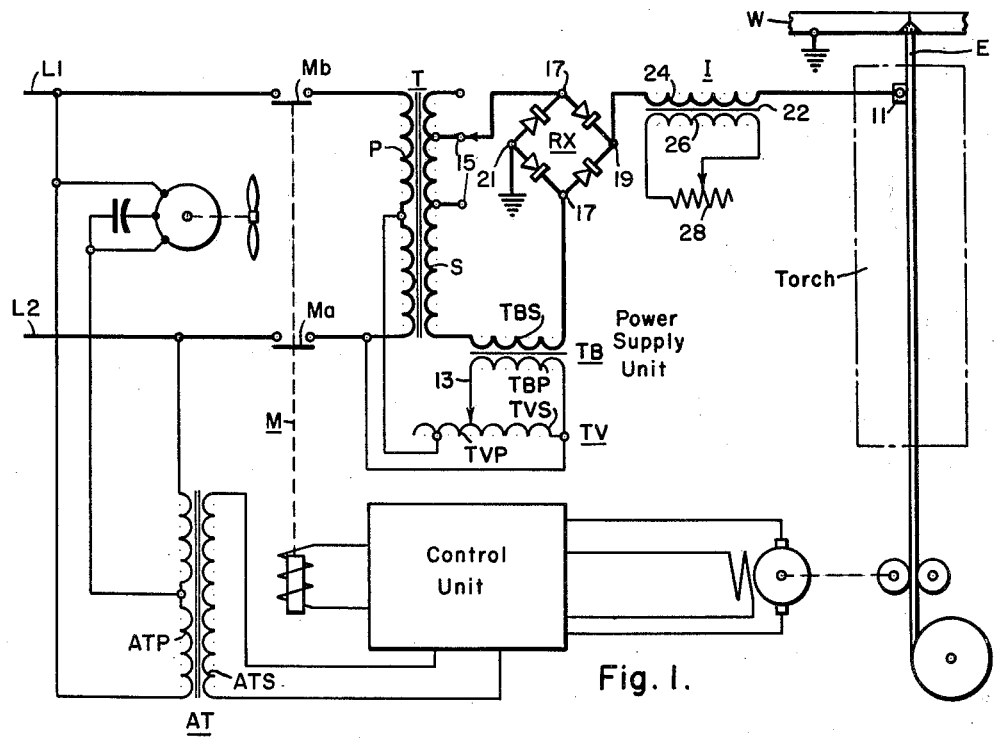
FIG. 1 is a schematic showing a preferred embodiment of this invention.

The apparatus shown in FIG. 1 is based on the apparatus disclosed in the above-identified application Serial No. 757,513. This apparatus includes a torch, a control unit, and a power supply unit and is supplied from conductors L1 and L2 which may be connected to the buses of a commercial single-phase alternating-current supply, preferably of the 220 or 440 volt type, through the usual disconnects or circuit breakers (not shown).

The torch may be of any suitable type available in the art and specifically may be of the type shown in Bichsel Patent 2,813,193. Such a torch includes a channel through which an electrode E is connected to work W. The electrode E is driven through the channel by motor means M, for example, such as is shown in Bichsel et al. 2,823,331. The torch is provided with a brush or guide 11 for impressing a potential on the electrode E.

The control unit may be of any type available in the art such, for example, as is shown in Bichsel Patent 2,823,-331. It is connected to control the operation of the power supply unit and the supply of electrode E.

The power supply unit includes a main transformer T, a booster transformer TB, and a variable transformer TV. The variable transformer may be a Variac autotransformer.

The main transformer T has a primary P and a secondary S, the booster TB a primary TBP and a secondary TBS. The variable transformer TV has a primary TVP and a secondary TVS, the voltage of which may be set by a movable arm 13. The secondary S is provided with a plurality of taps 15 so that the secondary voltage may be set at selected magnitudes.

The primary P is adapted to be connected between conductors L1 and L2 through front contacts Ma and Mb of a contactor M. Where such control apparatus is included the contactor M may be controlled in the manner disclosed in Patent 2,823,331. The primary TVP is connected across all or part of the windings of the primary P and derives its potential from the windings across which it is connected. The primary TBP is connected across the secondary TVS of the variable transformer.

The power supply unit also includes a rectifier RX. This rectifier may be of the single-phase bridge type preferably including silicon elements. Such a rectifier includes alternating-current input terminals 17 and positive and negative output direct-current terminals 19 and 21 respectively. The alternating current terminals are connected in series with the selected portion of the secondary S and the secondary TBS. The power supply unit also includes an inductor I. This inductor I in accordance with this invention has a magnetizable core 22, a main winding 24 and an auxiliary winding 26 which is closely magnetically coupled to the main winding 24. The main winding 24 is connected to conduct the welding current between the electrode E and the work W and specifically between the positive terminal 19 of the rectifier RX and the brush 11 through which the potential is impressed on the electrode E. The negative terminal 21 is grounded and is thus connected to the work W which is also grounded.

The auxiliary winding is connected in a closed circuit with a variable resistor 28. By setting the variable resistor 28 the inductance of the inductor I may be set. The variable resistor 28 permits the inductance of I to be set precisely so that stable, spatter-free arc operation is produced.

Usually the setting of resistor 28 is correlated with the potential available between terminals 19 and 21 so that the metal transfer during welding is of the droplet type. The resistor 28 may also be set for spray metal transfer in the welding of such materials as aluminum and its alloys.

Figure 2:
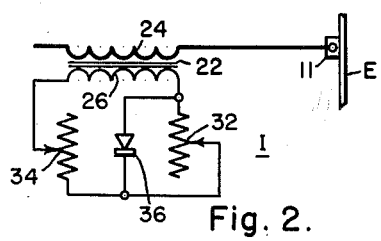
FIG. 2 is a fragmental schematic showing a modification of this invention.

The apparatus shown in FIG. 2 is provided with facilities for setting the response of the reactor differently to an increase and decrease in the welding current. Usually this apparatus is so set as to suppress a large increase in the welding current on the occurrence of a short, when a droplet bridges the space between the electrode and the work, but to permit a large peak voltage to develop to refire the arc on the occurrence of an open circuit at the arc.

In the apparatus shown in FIG. 2, resistors 32 and 34 are connected in series with the auxiliary winding 26. At least one of the resistors 32 is shunted by a rectifier 36 (which may be a silicon diode). The rectifier is so poled as to block the current induced in winding 26 when the curent between the electrode E and the work W decreases, for example, when an open circuit suddenly appears between the electrode E and the work W. The resistor 32 is preferably of high magnitude.

In the use of the apparatus the resistor 34 is so set as to produce the desired response to an increase in welding current. On the occurrence of a decrease in welding current the resistance in the loop including winding 26 includes the resistance 32 and is so large that a large potential peak develops in the welding circuit having proper magnitude and duration to refire the arc. Where desirable, the back resistances of rectifier 36 may serve as the resistance 32.

Figure 3:
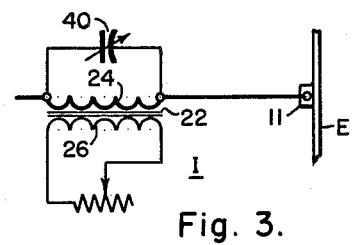
FIG. 3 is a fragmental schematic showing another modification of this invention; and, FIGS. 4, 5 and 6 are fragmental schematics showing still further embodiments of this invention.

In the apparatus shown in FIG. 3, the winding 24 is connected in a parallel resonant network with a variable capacitor 40. The capacitor 40 serves to tune the network substantially to the frequency at which the droplets are deposited.

In the apparatus shown in FIG. 3, the impedance of the network becomes very high for voltage pulsations having a frequency of the droplet deposit. The operation of the arc may be correlated to this network so that the deposit is smooth and free of spatter.

Figure 5:
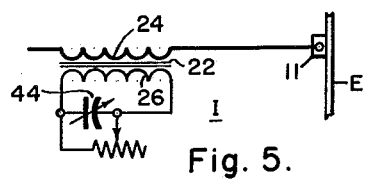
Figure 6:
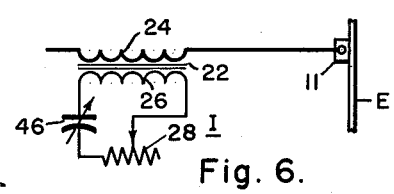

The resonance may also be introduced into the auxiliary winding circuit by capacitors 44 and 46 respectively as shown in FIGS. 5 and 6. FIG. 5 shows a parallel resonant network and FIG. 6 a series resonant network in which 46 and 26 are tuned to correspond to the droplet deposit. At resonance the only impedance of this series resonant network would be the resistance 28 and any resistance of reactor I.

Figure 4:
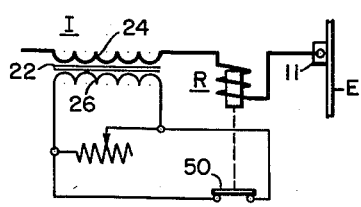

FIG. 4 shows a system in which the reactance I is suppressed during starting by the back contact 50 of a current relay R which picks up once the welding current starts to flow. The core of R may be of the slow dropout type so that the relay R does not respond to the current fluctuations of the arc.

The essential features of the invention disclosed herein are presented briefly in the following comment:

This invention deals with what is generally known as a D.C. smoothing reactor. Such reactors are commonly used on D.C. arc welders to provide the electrical transient characteristics essential to good arc stability and welding performance. The reactor is used on single-phase rectifier D.C. arc welders where it prevents current going to zero each half cycle by (in effect) partially filling the valleys of the current wave form, thereby eliminating arc outage and imparting continuous current characteristics.

This type of reactor has more recently found wide usage in constant potential type D.C. arc welders, where it serves an important function, particularly in $CO_2$ shielded-arc welding in the drop transfer range.

In the past, it has been customary to use a fixed air gap type iron core reactor with a series-parallel or a tapped winding which provides some adjustment of reactance characteristics. The range of welding conditions encountered in the use of such apparatus is relatively broad—at least 50 to 800 amperes and such adjustment of the main current carrying winding is too slow and too cumbersome to meet the demands of many welding operations. Also, it is desirable to be able to adjust the reactance characteristic to a finer degree over a broad range to suit precisely the different welding problems which are encountered.

Since the supply is of the D.C. type, the reactor is only effective on change in current—that is, in reacting with the fluctuating component of the welding current. The voltage induced in the reactor is proportional to the rate of change of current. The steady continuous component of the D.C. welding current is not influenced by the reactor except for the relatively small I.R. drop.

The fluctuating component of the welding current resulting from the highly irregular and transient load characteristics of the welding arc are influenced by the reactor and it is this component of the load current which the reactor is intended to control.

It has been found that by adding a second winding 26 closely coupled to the main D.C. winding 24, the reactor I can be made to have controllable reactance characteristic over a broad range. This control winding 26 may be of relatively small capacity and larger number of turns to suit the control means. This winding 26 does not carry any of the welding current and the voltage induced in the winding 26 is that resulting from welding current fluctuations, the voltage being proportioned to the rate of change of current at any instant. Consequently, the winding 26 and control means 28, 32, 34, 36 may be of relatively small capacity.

The control means may be a rheostat 28, 32, 34 or other device to control the impedance in the control winding circuit between the limits of zero and infinity (short circuit to open circuit). This provides a variable stepless control.

In accordance with another aspect of this invention inductive and capacitive tuning components 44, 46 are provided in connection with the auxiliary winding 26, such as to produce a natural period of oscillation adjustable to the desired rate of droplet transfer in the arc, the purpose being to produce a greater regularity of drop transfer.

It is also within the scope of this invention to introduce oscillation into the auxiliary winding circuit from an external source for the same purpose of forcing a greater regularity of droplet transfer.

Another aspect of this invention (FIG. 2) arises from the realization that the reactor I serves a double function, first to retard the rate of rise of current when the arc approaches or reaches the condition of short circuit and second to provide an additional peak voltage instantly following the momantary short circuit which is necessary or desirable to assure prompt reignition of the arc.

The auxiliary winding 26 in conjunction with the resistors 32 and 34 function as a damping circuit. The rate of rise of current will be damped to the extent depending on the amount of impedance (resistor adjustment) in the circuit. In similar manner the rate of decay of the reactor flux will be retarded by the auxiliary circuit thus limiting the peak value of voltage induced in the reactor winding 24. This aspect of the invention covers the idea of blocking the secondary circuit in one direction by means of a semi-conductor or rectifier 36 so that the reactor I will have an adjustable effect on rate of rise of welding current but will not be retarded in its ability to produce a peak voltage when the welding current suddenly decreases.

A variable resistor 32 shunting the rectifier 36 provides a means of adjusting the degree of blocking with resultant effect on magnitude and duration of the peak voltage induced at time of current decay.

While preferred embodiments of this invention have been disclosed herein, many modifications thereof are feasible. For example, the power may be derived from a polyphase supply as disclosed in Bichsel 2,786,160. In this case, the inductor I is connected in series with conductors 29 and 39 (FIG. 1, Bichsel) and the electrode 21 and the work. The power supply may also be of the constant current variable voltage type as disclosed in Rebuffoni 2,825,004. The invention then is not to be restricted except insofar as is necessitated by the spirit of the prior art.

I claim as my invention:

1. The method of arc-welding work with a consumable electrode supplied from a direct-current power supply of the constant potential type through reactance means having a main winding in circuit with said electrode and work and an auxiliary winding connected in a variable resistance circuit, the said method comprising the steps of setting the potential of said supply so that the deposit of fused metal from said electrode is of the droplet type as distinct from the spray type and setting said variable resistance in said circuit so that the deposit of metal from said electrode is substantially continuous and substantially free from spatter.

2. The method of arc-welding work with a consumable electrode supplied from a direct-current power supply of the constant potential type through reactance means having a main winding in circuit with said electrode and work and an auxiliary winding connected in an asymmetrical variable resistance circuit, the said method comprising the steps of setting the potential of said supply so that the deposit of fused metal from said electrode is of the droplet type as distinct from the spray type and separately setting the resistance of said variable resistance circuit for currents of opposite polarities induced in said variable resistance circuit thus setting the damping of the rate of rise of current by said reactance means during a transient and the peak magnitude and the duration of the voltage produced during a sudden decrease in current through said reactance means at magnitudes such that the deposit of metal from said electrode is substantially continuous and substantially free from spatter.

3. The method of arc-welding work with a consumable electrode supplied from a direct-current power supply of the constant potential type through reactance means having a main winding in circuit with said electrode and work and means connected in a resonant network of variable frequency with said winding, the said method comprising the steps of setting the potential of said supply so that the deposit of fused metal from said electrode is of the droplet type as distinct from the spray type and setting said resonant network to correspond to the rate at which the droplets are deposited so that the deposit of metal from said electrode is substantially continuous and substantially free from spatter.

4. Arc welding apparatus for welding work with an electrode including power supply means of the direct current type including an electrically positive pole and an electrically negative pole, a reactor having a main winding and an auxiliary winding magnetically coupled to said main winding, variable resistance means, means connecting in series said electrode, said work, said poles and said main winding, means connecting said auxiliary winding in series with said variable resistance means, rectfier means, and means connecting said rectifier means to shunt a portion of said resistance means.

5. Arc welding apparatus for welding work with an electrode including power supply means of the direct current type including an electrically positive pole and an electrically negative pole, a reactor having a main winding and an auxiliary winding magnetically coupled to said main winding, variable resistance means, means connecting in series said electrode, said work, said poles and said main winding means connecting said auxiliary winding in series with said variable resstance means, rectifier means connecting said rectifier means to shunt a portion of said resistance means, said rectifier means being so poled relative to siad supply as to block the current induced in said auxiliary winding by reason of the decay of magnetic flux in said reactor and said shunted resistance means being of substantial magnitude.

6. Arc welding apparatus for welding work with an electrode including power supply means of the direct current type including an electrically positive pole and an electrically negative pole, a reactor, means connecting in series said electrode, said work, said poles and said reactor, capacitive means, and means connecting said reactor and said capacitive means in a resonant network.

7. Arc welding apparatus for welding work with an electrode including power supply means of the direct current type including an electrically positive pole and an electrically negative pole, a reactor having a main winding and an auxiliary winding magnetically coupled to said main winding, a variable resistor, a rectifier, means connecting in series said electrode, said work, said poles and said main winding, and means connecting said auxiliary winding in series with said variable resistor and said rectifier, said rectifier being poled to block the flow of induced current through said auxiliary winding when the current through said main winding decreases.

8. Arc welding apparatus for welding work with an electrode including power supply means of the direct current type including an electrically positive pole and an electrically negative pole, a reactor having a main winding and an auxiliary winding magnetically coupled to said main winding, a variable resistor, means connecting in series said electrode, said work, said poles and said main winding, a tuning reactor, means connecting said tuning reactor and said auxiliary winding in a parallel resonant network, and means connectig said auxiliary winding in series with said variable resistor.

9. Arc welding apparatus for welding work with an electrode including power supply means of the direct current type including an electrically positive pole and an electrically negative pole, a reactor having a main winding and an auxiliary winding magnetically coupled to said main winding, a variable resistor, means connecting in series said electrode, said work, said poles and said main winding, a tuning reactor, and means connecting said auxiliary winding in series with said tuning reactor, variable resistor with said tuning reactor in a series resonant network with said winding.

10. Arc welding apparatus for welding work with an electrode including power supply means of the direct current type including an electrically positive pole and an electrically negative pole, a reactor having a main winding and an auxiliary winding magnetically coupled to said main winding, a variable resistor, means connecting in series said electrode, said work, said poles and said main winding, means connecting said auxiliary winding in series with said variable resistor, and contact means short-circuiting said auxiliary winding in the standby condition of said apparatus and responsive to the flow of welding current to interrupt the short-circuiting.

11. The method of arc-welding work with a consumable electrode supplied from a direct-current power supply of the constant potential type through reactance means having a main winding in circuit with said electrode and work and an auxiliary winding connected in an asymmetrically conducting variable resistance circuit, said variable resistance circuit having a first resistance for current flow through said variable resistance circuit of a polarity corresponding to an increase in welding current and a second resistance for current flow through said variable resistance circuits of the opposite polarity, the said method comprising the steps of setting the potential of said supply so that the deposit of fused metal from said electrode is of the droplet type as distinct from the spray type, setting said first resistance so as to suppress a large increase in welding current on the occurrence of a short-circuit between said electrode and work when a droplet bridges the space between said electrode and work, and setting said second resistance so that a large voltage peak is developed to refire the arc in the interrupters of the arc between said electrode and work.

12. Arc welding apparatus for welding work with an electrode including power supply means of the direct current type for supplying a potential for firing and maintaining a welding arc and including an electrically positive pole and an electrically negative pole, a reactor for suppressing excessive rise in welding current on the occurrence of a short-circuit in said arc and for providing a potential by decay of flux therethrough on the occurrence of an arc outage, said reactor having a main winding and an auxiliary winding magnetically coupled to said main winding, a variable resistor, means connecting in series said electrode, said work, said poles and said main winding, and means connecting said auxiliary winding in series with said variable resistor, said variable resistor serving to adjust the reactance of said reactor to the most propitious magnitudes of suppressing said excessive rise and for refiring.

13. Arc welding apparatus for welding work with a consumable electrode including power supply means of the constant-potential direct current type for supplying a potential for firing and maintaining a welding arc and including an electrically positive pole and an electrically negative pole, said potential being maintained at a magnitude such that the deposit of material from said electrode is of the droplet type, some droplets from said deposit during operation bridging the gap between said electrode and work and producing short-circuits followed by arc outages, a reactor for suppressing excessive rise in welding current on the occurrence of a short-circuit in said arc and for providing a potential by decay of flux therethrough on the occurrence of an arc outage, said reactor having a main winding and an auxiliary winding magnetically coupled to said main winding, a variable resistor, means connecting in series said electrode, said work, said poles and said main winding, and means connecting said auxiliary winding in series with said variable resistor, said variable resistor serving to adjust the reactanec of said reactor to the most propitious magnitudes of suppressing said excessive rise and for refiring.

14. Arc welding apparatus for welding work with a consumable electrode by depositing metal in droplets from said electrode on said work, the said apparatus including power-supply means of the direct-current type having an electrically positive pole and an electrically negative pole, a reactor, means connecting in series said electrode, said work, said poles and said reactor, capacitive means, and means connecting said reactor and said capacitive means in a parallel resonant network tuned to the frequency of deposit of said droplets.

References Cited in the file of this patent

UNITED STATES PATENTS

| | | |
|---|---|---|
| 1,238,406 | Homrighaus | Aug. 28, 1917 |
| 1,353,711 | Bergman | Sept. 21, 1920 |
| 1,485,744 | Turbayne | Mar. 4, 1924 |
| 1,721,348 | Mawdsley | July 16, 1929 |
| 1,993,455 | Richards | Mar. 5, 1935 |
| 2,139,160 | Hebeler | Dec. 6, 1938 |
| 2,259,788 | Adler | Oct. 21, 1941 |
| 2,763,711 | Bichsel | Sept. 18, 1956 |
| 2,825,004 | Rebuffoni et al. | Feb. 25, 1958 |

FOREIGN PATENTS

| | | |
|---|---|---|
| 191,714 | Austria | Sept. 10, 1957 |
| 528,537 | Belgium | May 15, 1954 |